US011952155B2

(12) United States Patent
Lema Martinez et al.

(10) Patent No.: US 11,952,155 B2
(45) Date of Patent: Apr. 9, 2024

(54) MANUFACTURING A FLEXIBLE CONTAINER

(71) Applicant: HOFFMANN-LA ROCHE INC., Little Falls, NJ (US)

(72) Inventors: Carmen Lema Martinez, Basel (CH); Joerg Luemkemann, Basel (CH); Tobias Werk, Riehen (CH); Thomas Zumstein, Basel (CH); Daniel Kullmann, Zurich (CH)

(73) Assignee: HOFFMANN-LA ROCHE INC., Little Falls, NJ (US)

( * ) Notice: Subject to any disclaimer, the term of this patent is extended or adjusted under 35 U.S.C. 154(b) by 408 days.

(21) Appl. No.: 17/296,770

(22) PCT Filed: Nov. 25, 2019

(86) PCT No.: PCT/EP2019/082342

§ 371 (c)(1),
(2) Date: May 25, 2021

(87) PCT Pub. No.: WO2020/109195

PCT Pub. Date: Jun. 4, 2020

(65) Prior Publication Data

US 2022/0024616 A1 Jan. 27, 2022

(30) Foreign Application Priority Data

Nov. 26, 2018 (EP) .................................... 18208318

(51) Int. Cl.

| | |
|---|---|
| ***B65B 3/00*** | (2006.01) |
| ***A61J 1/10*** | (2006.01) |
| ***A61J 1/14*** | (2023.01) |
| ***A61J 1/20*** | (2006.01) |
| ***B65B 3/02*** | (2006.01) |
| ***B65B 29/10*** | (2006.01) |

(52) U.S. Cl.
CPC ................ *B65B 3/003* (2013.01); *A61J 1/10* (2013.01); *A61J 1/1475* (2013.01); *A61J 1/2024* (2015.05);
(Continued)

(58) Field of Classification Search
CPC ......... B65B 3/003; B65B 3/022; B65B 29/10; A61J 1/10; A61J 1/1475; A61J 1/2024; A61J 1/2093
See application file for complete search history.

(56) References Cited

U.S. PATENT DOCUMENTS 4,467,588 A * 8/1984 Carveth ................ A61J 1/2093 53/425
4,550,825 A * 11/1985 Sutryn et al. ......... A61J 1/2089 383/96

(Continued)

FOREIGN PATENT DOCUMENTS

EP 1364638 A2 11/2003
JP H05-3904 A 1/1993

OTHER PUBLICATIONS

International Search Report and Written Opinion dated Feb. 25, 2020 in International Appln. No. PCT/EP2019/082342.

(Continued)

*Primary Examiner* — Stephen F. Gerrity
(74) *Attorney, Agent, or Firm* — MEDLER FERRO WOODHOUSE & MILLS PLLC

(57) ABSTRACT

A method of manufacturing a flexible container housing a drug substance is disclosed that includes forming a first compartment from a flexible sheet-like material, filling a liquid into the first compartment, sealing the first compartment, forming a second compartment from the flexible sheet-like material, filling a dry drug formulation into the second compartment, and sealing the second compartment. The method further involves lyophilizing the drug formu-
(Continued)

lation inside a tubular cartridge, filling the second compartment by introducing the tubular cartridge through an opening of the second compartment such that an open end of the tubular cartridge is positioned distant from the opening of the second compartment, providing the drug formulation from the open end of the tubular cartridge into the second compartment, and withdrawing the tubular cartridge from the second compartment. The first and second compartments are separated by a frangible seal which opens when the first compartment is compressed.

16 Claims, 3 Drawing Sheets

(52) U.S. Cl.
CPC ............. *A61J 1/2093* (2013.01); *B65B 3/022* (2013.01); *B65B 29/10* (2013.01)

(56) References Cited

U.S. PATENT DOCUMENTS

| | | | | |
|---|---|---|---|---|
| 5,196,001 | A * | 3/1993 | Kao | A61J 1/2093 604/82 |
| 5,484,410 | A * | 1/1996 | Kriesel et al. | A61J 1/2089 604/82 |
| 6,162,205 | A * | 12/2000 | Shichi et al. | A61J 1/2093 604/416 |
| 9,931,458 | B1 | 4/2018 | Di Naro | |
| 2003/0175313 | A1 | 9/2003 | Garrec et al. | |
| 2009/0113753 | A1* | 5/2009 | Pepper et al. | A61J 1/2093 34/92 |
| 2009/0223080 | A1 | 9/2009 | McCarthy et al. | |
| 2009/0254032 | A1* | 10/2009 | Muramatsu | A61J 1/2093 604/87 |
| 2012/0029463 | A1* | 2/2012 | Gonzalez | A61J 1/2093 604/408 |
| 2015/0107195 | A1 | 4/2015 | Tsakas et al. | |
| 2017/0203868 | A1* | 7/2017 | Py et al. | B65B 3/022 |
| 2017/0203871 | A1* | 7/2017 | Murto et al. | B65B 3/003 |
| 2018/0028401 | A1* | 2/2018 | Chen | A61J 1/2093 |
| 2019/0015606 | A1* | 1/2019 | Luerig | A61M 11/007 |
| 2021/0205172 | A1* | 7/2021 | Miyazaki et al. | B65B 3/003 |

OTHER PUBLICATIONS

Notices of Reasons for Rejection dated Aug. 29, 2023 in Japanese Patent Appl. No. 2021-529293 (with English language translation.).

* cited by examiner

MANUFACTURING A FLEXIBLE CONTAINER

TECHNICAL FIELD

The present invention relates to a method of manufacturing a flexible container housing a drug substance. Such methods include the steps of (i) forming a first compartment of the container out of a flexible sheet-like material, (ii) filling a liquid into the first compartment of the container, (iii) sealing the first compartment, (iv) forming a second compartment of the container out of the flexible sheet-like material, (v) filling a dry drug formulation into the second compartment, and (vi) sealing the second compartment, can provide the drug substance in a securely storable and conveniently applicable form, particularly for parenteral or intravenous administration.

BACKGROUND ART

In many medical applications, pharmaceuticals or drug substances are provided in liquid form. Thereby, it can be advantageous to orally, parenterally, intravenously or subcutaneously administer the liquid drug substance. The drug substance has to be stored and supplied in a sterile fashion. Therefore, the drug substances are typically provided in appropriate containers. For example, for intravenous administration it is known to use infusion bags which can be hanged on a support and continuously drop the liquid drug substance or a drug diluent mixture through an infusion needle into a patient.

However, in connection with liquid drug substances, many pharmaceuticals and particularly biopharmaceuticals cannot be stored and supplied for an appropriate duration in liquid form since they commonly are unstable in that form. For example, many antibiotics or other biological drugs are unstable in liquid form such that their quality cannot be maintained as liquid. In particular, stress caused by shaking, microbiological growth, aggregation or the like may compromise the drugs. In this context, it is known to supply the drug in a dry form, such as in a powder or the like, in which they are essentially more stable and robust compared to its liquid form. The dry drug formulation is then reconstituted or dissolved shortly before administration.

In the context of infusion bags, EP 1 364 638 A1 describes a flexible container with two compartments. In particular, an infusion bag made of two inter-sealed sheets is shown having one compartment filled with a liquid diluent and another compartment filled with a dry drug formulation. The two compartments are separated by a peelable seal which can be ruptured by applying a pressure on one of the compartments. Like this, an operator can mix the dry drug product with the diluent in a sterile fashion shortly before administration after manually pressing one of the compartments such the peelable seal ruptures and transferring the liquid to the dry drug product.

However, even though two compartment flexible containers known in the art often are beneficial in medical applications, they typically are not suitable for highly potent lyophilized drug formulations. In particular, usually the drug compartment is filled via an opening between the sheets and then this compartment is sealed. In such known filling processes often some drug formulation escapes the compartment during filling or is captured in the seal in between the sheets when closing the opening. Particularly, when lyophilized drug products which usually are cake-shaped are involved, filling the compartment of a flexible container can be difficult. Moreover, since highly potent drugs are usually provided at comparably small dosages, loss of small amounts of the drug can affect the treatment, already.

Therefore, also in infusion applications, highly potent lyophilized substances are today commonly provided in vials. Before administration they are dissolved by adding the diluent and then the dissolved drug formulation is transferred into an infusion bag. However, such administration may be comparably dangerous during preparation, involves a comparably high amount of steps which may be time consuming, may require an appropriate infrastructure, generates comparably delicate waste and is comparably prone to misuse or other issues affecting the quality of the medical treatment.

Particularly, if comparably poorly specialised persons are involved or the environment does not allow appropriate application, such as it often the case in rather low and middle income countries, the treatment by infusion may be inappropriate.

Therefore, there is a need for a method of efficiently and safely manufacturing a flexible container, which allows the provision of a highly potent drug formulation together with a suitable diluent or constituent.

DISCLOSURE OF THE INVENTION

According to the invention this need is settled by a method of manufacturing a flexible container housing a drug substance as described herein.

In particular, the invention is a method of manufacturing a flexible container housing a drug substance. This method comprises the steps of: forming a first compartment of the container out of a flexible sheet-like material; filling a liquid into the first compartment of the container; sealing the first compartment; forming a second compartment of the container out of the flexible sheet-like material; filling a dry drug formulation into the second compartment. Thereby, typically before filling into the second compartment, the drug formulation is lyophilised inside a tubular cartridge such that the dry drug formulation is generated and held in the tubular cartridge. More specifically, filling the dry drug formulation into the second compartment comprises: introducing the tubular cartridge holding the dry drug formulation through an opening of the second compartment of the container such that an open end of the tubular cartridge is positioned distant from the opening of the second compartment; providing the dry drug formulation out of the open end of the tubular cartridge into the second compartment; and withdrawing the tubular cartridge out of the opening of the second compartment of the container. The first compartment is separated from the second compartment by a frangible seal which opens when the first compartment is compressed.

The sequence of the steps involved in the method according to the invention can be different than listed hereinbefore. In particular, it is possible to first filling the second compartment and then filling the first compartment, vice versa, or to fill both compartments simultaneously. Advantageously, all or plural compartments are created prior to filling them in order to reduce the risk of product transfer. Also, as an alternative to performing one step after the other, some steps of the method can be executed in parallel, simultaneously or in one unified step. For example, the steps of filling the first and second compartments can be performed in parallel. Or, the steps of sealing the first and second compartments can be unified in one single step in which both compartments are sealed at the same time.

Filling of the first and second compartments can be performed from any side best suiting to the overall process. For example, the first compartment can be filled from a side, which is then sealed by the frangible seal separating the first and second compartments. Or, both compartments can be filled from a lateral side of the container either one after the other or simultaneously, which lateral side is the firmly sealed after the compartments are filled.

The liquid involved in the method can particularly be a reconstituent such as a diluent, i.e. a liquid suitable for diluting the dry drug formulation when being mixed. Such diluent can be a physiological solution such as a sodium chloride (NaCl) solution, a sucrose solution, an aqueous dextrose or any other similar solution. The NaCl solution can, e.g., be a 0.9% NaCl solution. The sucrose solution can, e.g., be a 5% sucrose solution. The aqueous dextrose can, e.g., be a 10% dextrose solution.

The term "drug" as used herein relates to a therapeutically active agent, also commonly called active pharmaceutical ingredient (API), as well as to a combination of plural such therapeutically active substances. The term also encompasses diagnostic or imaging agents, like for example contrast agents (e.g. MRI contrast agents), tracers (e.g. PET tracers) and hormones, that need to be administered in liquid form to the patient.

The term "drug formulation" as used herein relates to a single drug as defined above or a plurality of such drugs mixed or formulated. For example, besides the drug, a drug formulation may additionally comprise an excipient and/or other auxiliary ingredients.

The term "dry drug formulation" relates to a solid drug formulation as it typically results from lyophilizing, i.e. a lyophilisate. It can also relate to or comprise a semisolid or powderous drug substance. When being held in the tubular cartridge, the dry drug formulation can have a shape of the interior volume of the cartridge or a section thereof. After being transferred into the second compartment of the container, it can still have the same shape or it can disaggregate, e.g., into a powder or fractioned structure.

The term "drug substance" as used herein relates to a drug formulation as defined above in a form that is suitable for administration to the patient. Thereby, the drug substance can be the pure drug formulation or a drug formulation reconstituted, diluted or dissolved in an administrable form. A particularly preferred drug substance in the context of the invention is a solution, in particular a solution for oral, parenteral, intrathecal or ophthalmic administration, injection or infusion.

The term "drug product" as used herein relates to a finished end product comprising a drug substance or a plurality of drug substances. In particular, a drug product may be a ready to use product having the drug substance in an appropriate dosage and/or in an appropriate form for administration. For example, a drug product may include a handling or storage device such as a flexible container.

Lyophilisation in the context of the present invention is a low temperature dehydration process, which involves freezing the substrate, i.e. the drug formulation, lowering pressure and then removing ice by sublimation and desorption. The result from lyophilisation is the lyophilisate. Lyophilisation is also referred to as freeze-drying. When being lyophilised inside the cartridge, the drug formulation can be held by friction or a similar mechanism inside the tubular cartridge. Lyophilisation can cover bulk freeze drying, which may produce lyophilized microspheres, or spray drying.

The term "flexible" as used in connection with the material or the container can relate to a comparably soft material which is not shape stable. Particularly, such material does usually not keep its shape when being differently positioned or oriented. Typical flexible materials are foils and particularly plastic foils or foil like structures such as tight meshes or the like.

The term "sheet-like" as used in connection with the material the container is made of relates to a flat typically essentially even substrate having a thickness which is considerably smaller than its length and width. In particular, the sheet-like material can be a foil or a similar structure.

The sheet-like material can be a sheet-like single plastic, composite, plastic blend or multilayer plastic. It can be altered in its surface properties to improve extractability, to reduce or exclude gas permeation and leaching of additives and/or to simplify sealing. The sheet-like material needs to be compatible with its intended purpose such as compatible with parenteral or oral solutions, nonreactive when chemicals are stored in the container and/or aligned to required guidelines applicable to the drug substance, e.g., the guidelines of the Unites States Food and Drug Administration (FDA) or the guidelines of the European Medicines Agency (EMA).

The term "sealing" as used herein relates to a process or step of attaching two or more elements or portions of an element to each other such that a gas, a liquid or another fluid cannot pass the attached portions. In embodiments where the flexible sheet-like material is a foil and particularly a plastic foil, the sealing can be provided by applying a predefined temperature and/or pressure at a particular location of the foil. Thereby, the foil can be coated with an adhesive which is thermo- and or pressure-activatable. Alternatively or additionally, the sealing can involve ultrasound-, high frequency- and or radio frequency welding. In particular, sealing can involve creating seal seams. The seal seam can be embodied as firm seals and/or frangible seal. The term "frangible seal" relates to a connection in the flexible sheet-like material which can be released, broken or ruptured when compressing a compartment adjacent to the frangible seal. Frangible seals can also be referred to a peelable seal, non-permanent weak seals or breakable seal.

Specifically, forming the first and second compartments can be embodied by positioning two foils or sheets at each other and then sealing the two foils along the edges of the foils or at any other appropriate portion. Alternatively or additionally, one single foil or sheet can be folded in a suitable manner and then sealed along the edges of the foil or at any other appropriate portion. The compartments can be sized for the filling of 20 ml up to 2'000 ml. In the end the container can be a bag or bag-like device such as an infusion bag, a pouch or similar.

Compressing the first compartment can be achieved, e.g., by applying a pressure to the first compartment. In particular, in use of the container the first compartment can be manually compressed such that the frangible seal opens and the liquid is transferred from the first compartment into the second compartment. Thereby, the seals of the container other than the frangible seal can stay tightly closed.

The term "positioned distant" in connection with the open end of the tubular cartridge and the opening of the second compartment relates to an arrangement in which the opening is not contacting the open end of the tubular cartridge. In particular, whereas the opening of the second compartment may be contacting the outer cartridge, the open end is not in contact or directly adjoining the opening. More specifically, the distance between the open end of the cartridge and the opening of the compartment is sufficient to prevent any drug formulation to be located in or at the opening or even outside the second compartment after removal of the cartridge and during the opening of the second compartment is sealed. Like this, it can be achieved that no drug formulation gets outside the packaging, that drug formulation is located in the sealing such that the sealing of the second compartment is weakened, and that the amount of drug formulation or the dosage of the drug substance can be precisely determined.

The tubular cartridge typically is made of an essentially rigid material. It can particularly have a comparably high thermal conductivity and, more specifically, a thermal conductivity which is higher than the thermal conductivity of glass. The thermal conductivity of glass can be 1.05 W/mK at 25° C. The inside of the tubular cartridge can be coated with a friction reducing coating or friction reducing layer facilitating the complete withdrawal of drug formulation.

The method according to the invention allows to efficiently and safely manufacture a flexible container such as an infusion bag providing a sensible drug substance. In particular, the manufactured container can house a highly potent drug formulation and a suitable diluent separated from the drug formulation during supply. Before administration the drug formulation can conveniently be reconstituted by mixing the liquid with the dry drug formulation. More specifically, the liquid can be provided from the first compartment to the second compartment by manually compressing the first compartment. Like this, the pressure inside the first compartments increase, the frangible seal breaks and opens, and the liquid flows into the second compartment. Such easy preparation of the drug substance can be executed by comparably low trained or low skilled persons. The risk of misuse can considerably be lowered. Also, preparation time, human error, e.g. by product identification, preparation, dosage, etc., probability or waste generation can be considerably low in comparison to the known methods.

As mentioned, the drug formulation preferably is a high potency drug formulation. It can particularly comprise a biological component such as a monoclonal antibody, an antibody drug conjugate, an antibody fragment, a locked nucleic acid (LNA) or the like. The term "potency" in this context can be a measure of drug activity expressed in terms of the amount required to produce an effect of given intensity. Thus, the terms "high potency", "highly potent" or similar can relate to a formulation or substance which is active at comparably small amounts or dosages. In other words, a highly potent drug formulation can evoke a given response at comparably low concentration, while a drug formulation of lower potency can evoke the same response only at higher concentrations. The potency may depend on both the affinity and efficacy of the drug formulation. Thereby, such drug formulations or substances can be particularly problematic since comparably small variations in dosing or comparably small contaminations can be comparably effective.

In numbers, a highly potent drug formulation can be defined as a drug formulation having a biological activity at approximately 15 micrograms (μg) per kilogram (kg) of body weight or below in humans. This is equivalent to a therapeutic dose at approximately 1 milligrams (mg) or below in humans. The highly potent drug formulation can thus be defined as a drug having an inhalative Acceptable Daily Exposure (ADE) value of 1.5 μg/d or less, translating into an Indicative Occupational Exposure Limit (IOEL) value of 0.15 μg/m$^3$. In particular, the highly potent drug formulation can be a class 3B drug or the like. When used with highly potent drug formulations to be administered by infusion, the method according to the invention can be particularly beneficial.

Preferably, the liquid in the first compartment comprises a solvent for solving the dry drug formulation. The solvent can be a diluent or a similar liquid. By solving the drug formulation, it can be administered in a particularly suitable form at a specific dosage.

Preferably, the tubular cartridge is essentially cylindrical. The term "essentially cylindrical" can relate to forms slightly deviating from a geometrical cylinder. In particular, a cylinder being conical to a certain extent may still be essentially cylindrical. E.g., a conical cylinder having a sidewall slanted to a maximum of about 5°, about 3° or about 2° can still be essentially cylindrical. Also, the sidewall of the tubular cartridge may differ to a certain extent from a geometrical straight shape. The tubular cartridge can be embodied as a hollow cylinder wherein the open end is located at one end of the cylinder.

Preferably, the tubular cartridge has a conical shape widening towards the open end of the tubular cartridge. The conical shape of the cartridge can also be embodied over a portion of it only such that it has straight and conical sections. Such partial conical shape allows for the tubular cartridge still being essentially cylindrical. As mentioned above, even when the tubular cartridge is conical, i.e. being completely widening or having a widening section, it can still be essentially cylindrical since its main appearance can still be as a cylinder. In particular, the tubular cartridge can be slightly conical, i.e. widening to a comparably small extent only. Such tubular cartridge allows for efficiently providing the dry drug formulation. In particular, since the cartridge widens, the dry drug substance can loose its hold inside the cartridge when being forwarded and exit out of the open end. For example, the dry drug formulation can be pushed for releasing it from the cartridge and then, due to the conical shape, it is not hindered or held by the rest of the cartridge such that a more or less complete provision of the dry drug substance can efficiently be achieved.

Preferably an inner wall of the tubular cartridge is coated with a friction reducing material. Like this, the provision of the dry drug formulation out of the open end can be comparably efficient. It allows for reducing a residual portion of the drug formulation in the tubular cartridge.

Preferably, providing the dry drug formulation out of the open end of the tubular cartridge into the second compartment comprises forwarding a plunger through the tubular cartridge towards the open end such that the dry drug formulation is pushed out of the open end of the cartridge. This allows for an efficient provision of the drug formulation with comparable simple means.

Preferably, forming the first compartment of the container comprises sealing the flexible sheet-like material such that a firm seal is generated which does not open when the first compartment is compressed. Like this, the first compartment and also the complete container can be safely sealed or closed towards the outside of the container. Only, within the container between the compartments the frangible seal(s) allows for being opened without damaging the container.

Thereby, the firm seal preferably is generated by sealing the flexible sheet-like material at first conditions and the frangible seal is generated by sealing the flexible sheet-like material at second conditions different from the first conditions. For examples, the conditions can comprise an energy such as heat, ultrasound or the like, and/or pressure which is/are lower in the first conditions than in the second conditions.

Preferably, the second compartment has an opposite end at a maximum distance to the opening of the second compartment, and the dry drug formulation is provided out of the open end of the tubular cartridge into the second compartment near the opposite end of the second compartment. The term "near" in this connection can relate to a position at or close to the opposite end. In particular, it can relate to a position closer to the opposite end than to the opening. In particular, the tubular cartridge can be entered through the opening to a comparably large extent into the second compartment before providing the dry drug formulation. Like this, the risk of any residual drug formulation at the opening of the second compartment or even outside the container can considerably be lowered.

Advantageously, the container is equipped with a port. Such port can be attached after the sheet-like material is sealed. However, preferably, forming the second compartment of the container comprises sealing the port to the flexible sheet-like material such that a content of the second compartment can be expelled through the port. The port can be of any kind suitable for the intended application of the container. It can be a spout, a septum enabling withdrawal of liquid while preventing unintended spilling, or an adapter for being connected to another element such as an infusion tube or the like. For example, the port can be or comprise a long cylindrical opening or a septum that enables withdrawal of liquid while assuring protection from unintended spilling. These withdrawal supports are usually found in infusion bags, septum bottles, or squeeze pouches for nutrition. Advantageously, the port is made of a comparably rigid material which essentially keeps its shape when being sealed to the sheet-like material. Furthermore, additional elements like stoppers, septa or diaphragms can be sealed in the material, typically during a final welding step. Such a port allows for conveniently administering the drug substance, e.g. in an aseptic manner, after being prepared inside the container. In particular, the port allows for embodying the container to be suitable for a specific type of administration such as infusion. In addition to the port, other ports can be attached in the proximity of the port or on the opposing border of the flexible container. Also, ports can be placed into the edges of a vertical line or seam seal directed from top to bottom. To facilitate the attachment of ports on the lateral edges of the flexible sheets forming the flexible container, punctures in the sheet can be required where ports can be placed prior the final welding of the container takes place. The port/ports within the flexible container can manage the connectability to other containers or to devices used for administering or provision of the content of the flexible container.

In a preferred embodiment, the method further comprises: forming a third compartment of the container out of the flexible sheet-like material; lyophilizing a further drug formulation inside a further tubular cartridge such that the dry further drug formulation is generated and held in the further tubular cartridge; filling the dry further drug formulation into the third compartment by introducing the further tubular cartridge holding the dry further drug formulation through an opening of the third compartment of the container such that an open end of the further tubular cartridge is positioned distant from the opening of the third compartment, providing the dry further drug formulation out of the open end of the further tubular cartridge into the third compartment, and withdrawing the further tubular cartridge out of the opening of the third compartment of the container; and sealing the third compartment.

The third compartment can be separated from the first compartment and/or the second compartment by a frangible seal which opens when the respective compartment is compressed. Further, the container can have an additional compartment filled with the liquid or another liquid and separated from the third compartment by a frangible seal. The other liquid can also be a reconstituent as the liquid of the first compartment. It can also be a liquid drug or a similar substance.

The further drug formulation can be the same as the drug formulation. In such embodiments, the two or more compartments of containing the same drug formulation can be used to adapt a dosage of the drug substance before administration. In particular, as the need may be, the drug formulation of an appropriate number of compartments can be solved before administration such that the overall dosage can be set.

The further drug formulation can also be different from the drug formulation. For example, the further drug formulation can be required for a specific treatment in addition to the drug formulation but not suitable to be stored together with the drug formulation. In such a case, by providing plural individual compartments, the plural drug formulations can be mixed shortly before administration in one of the drug substance compartments, in a common compartment or in an empty compartment, e.g., positioned in between.

In some embodiments, the container can be equipped with a plurality of additional compartments each filled with a predefined amount of the drug formulation or with another drug formulation to be mixed with the drug substance before administration. Also, the container can have one or more additional compartments which are empty. Such compartment allows for (pre-)mixing before administration.

The compartments can be positioned anywhere in the container. For example, for allowing a particularly efficient filling, the compartments can all extent to one side edge of the container such that the compartments may be filled from one side only. Or, for achieving a safe application of the container such as a particular sequence of activation, the compartments can be distributed in the container such as on opposite side edges thereof.

As mentioned above, the container preferably is an infusion bag. Such infusion bags allow for a particularly efficient intravenous administration of the drug substance over a specific period.

Preferably, the method comprises a visual inspection of the first compartment and the second compartment for particulate matter, which is performed after sealing the first compartment and the second compartment. Such visual inspection can be implemented automatically by an appropriate device or by a person. It allows for maintaining high quality standard as it is required for pharmaceutical products. For example, such visual inspection allows for ensuring the reference standard 788 of the United States Pharmacopeia (USP).

Thereby, the first compartment and the second compartment and, eventually, any further compartments, preferably are at least partially or completely transparent. Such transparent compartments allow for an efficient visual inspection.

Preferably, the method is implemented in a blow fill and seal (BFS) process. Generally, BFS relates to a manufacturing technique used to produce liquid-filled containers. It is widely considered to be the superior form of aseptic processing by various medicine regulatory agencies including the U.S. Food and Drug Administration (FDA) in the packaging of pharmaceutical and healthcare products. The basic concept of BFS is that a container is formed, filled, and sealed in a continuous process without human intervention, in a sterile enclosed area inside a machine. Therefore, this technique can be used to aseptically manufacture sterile pharmaceutical liquid dosage forms. BFS may reduce personnel intervention making it a more robust method for the aseptic preparation of sterile drug substances. Thus, such process allows for a particularly efficient manufacture of the container in a quality sufficient to be a drug product.

BRIEF DESCRIPTION OF THE DRAWINGS

The method according to the invention and the thereby manufactured flexible containers are described in more detail herein below by way of exemplary embodiments and with reference to the attached drawings, in which.

DESCRIPTION OF EMBODIMENTS

In the following description certain terms are used for reasons of convenience and are not intended to limit the invention. The terms “right”, “left”, “up”, “down”, “under” and “above” refer to directions in the figures. The terminology comprises the explicitly mentioned terms as well as their derivations and terms with a similar meaning. Also, spatially relative terms, such as “beneath”, “below”, “lower”, “above”, “upper”, “proximal”, “distal”, and the like, may be used to describe one element’s or feature’s relationship to another element or feature as illustrated in the figures. These spatially relative terms are intended to encompass different positions and orientations of the devices in use or operation in addition to the position and orientation shown in the figures. For example, if a device in the figures is turned over, elements described as “below” or “beneath” other elements or features would then be “above” or “over” the other elements or features. Thus, the exemplary term “below” can encompass both positions and orientations of above and below. The devices may be otherwise oriented (rotated 90 degrees or at other orientations), and the spatially relative descriptors used herein interpreted accordingly. Likewise, descriptions of movement along and around various axes include various special device positions and orientations.

To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

Figure 1:
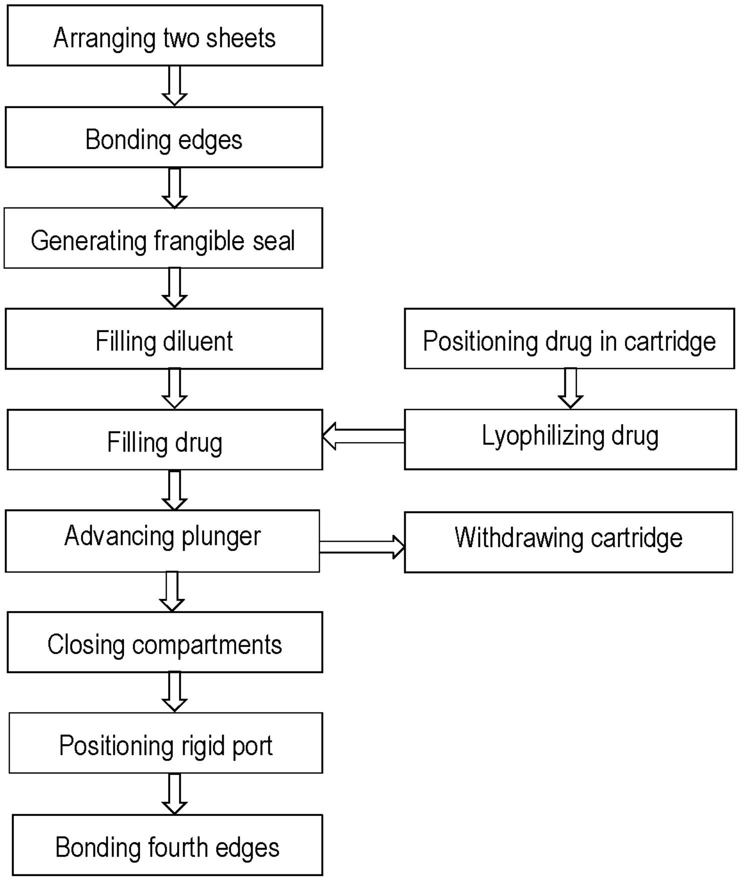
FIG. 1 shows a flow scheme of a first embodiment of a method of manufacturing a flexible container according to the invention.

FIG. 1 shows a first embodiment of a method of manufacturing an infusion bag as a flexible container housing a drug substance according to the invention. The method is embodied in a side fill and seal process or in a blow fill and seal (BFS) process in an at least partially aseptic environment. It comprises a step A in which two rectangular sheets of flexible plastic foil are arranged with their surfaces contacting each other as flexible sheet-like material. Thereby, the at least one of the sheets of foil is coated with an adhesive which is thermo- and pressure-activatable, wherein the coated surface of the sheets contacts the surface of the other sheet.

In a step B, two edges of the composition of the two sheets are pressurized at a first pressure and heated at a first temperature such that the sheets are bonded and sealed together at their edges. In particular, the first temperature and pressure are adjusted such that the seals generated in step B are firm seals. In a step C, a second pressure and a second temperature are applied which are lower than the first pressure and temperature, respectively. More specifically, the second temperature and pressure are applied such that two frangible seals are generated. By the two firm seals and the two frangible seals, a first compartment and a second compartment are formed between the sheets, which are separated from each other by one of the frangible seals. The first compartment extends over about half of the two sheets. The first and second compartment are open towards the same longitudinal side of the container. In a step D a diluent is filled in liquid form into the first compartment.

Preferably in parallel to any of steps A to D, a dry drug formulation is prepared. Thereby, in a step $E_i$ a highly potent biopharmaceutical drug formulation is positioned inside a tubular cartridge. In a step $E_{ii}$, the drug formulation is lyophilized inside the tubular cartridge in a way that the dry drug formulation is generated and held in the tubular cartridge. Then the lyophilized or dry drug formulation is filled into the second compartment by, in a step $E_{iii}$, introducing the tubular cartridge holding the dry drug formulation through an opening established by the open edges of the two sheets into the second compartment such that an open end of the tubular cartridge is positioned near an end of the second compartment opposite to the opening or compartment opening. Filling of the dry drug formulation further comprises a step $E_{iv}$ of providing the content of the tubular cartridge by advancing a plunger through it, and a step $E_v$ of withdrawing the tubular cartridge out of the opening of the second compartment as well as out of the container.

Following step $E_{iv}$, the first and second compartments are closed or sealed. In particular, in a step F the open side edge of the container is pressurized to the first pressure and heated to the first temperature such that the first and second compartments are closed by a firm seal. Then in a step G a rigid port is positioned between the non-sealed fourth edges of the two sheets. In a step H, these fourth edges are pressurized at the first pressure and heated at the first temperature such that the sheets are bonded and sealed together at their fourth edges. Thereby, a firm seal is established at the fourth edges. Alternatively, the rigid port can also be mounted in step B above.

Figure 2:
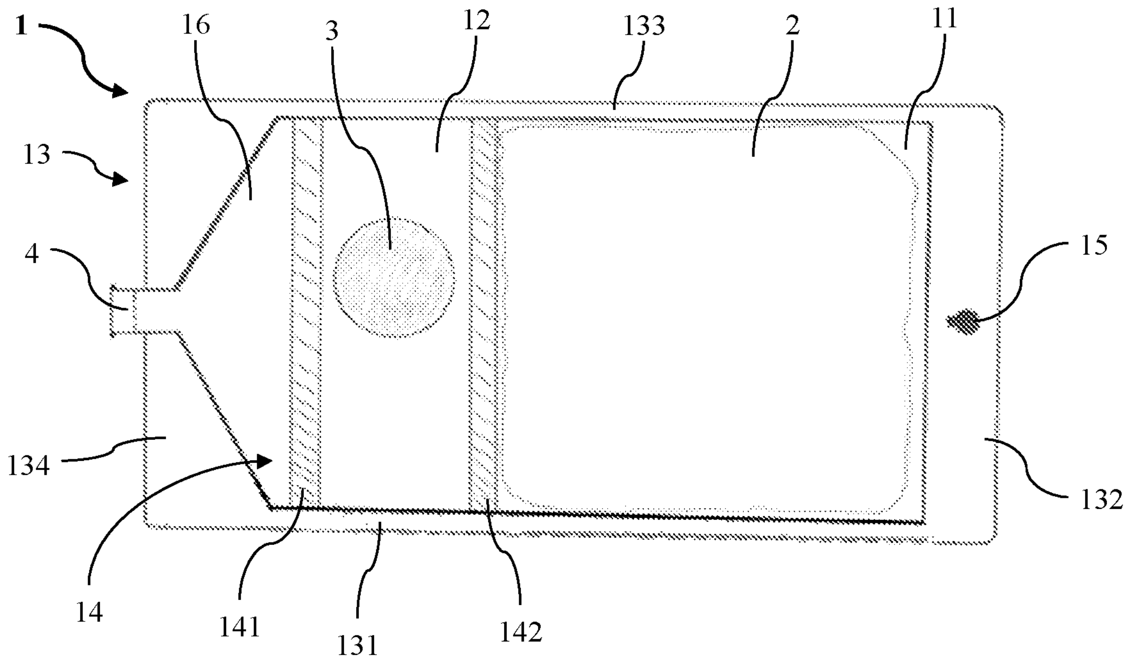
FIG. 2 shows a flexible container manufactured by the method of FIG. 1.

In FIG. 2 a first embodiment of a flexible container according to the invention in the form of an infusion bag 1 is shown as it results from the method described above in connection with FIG. 1. The infusion bag 1 has a first compartment 11 housing a liquid diluent 2, a second compartment 12 housing a highly potent lyophilized drug formulation 3 and an outlet compartment 16. The compartments 11, 12, 16 are formed by generating firm seals 13 and frangible seals 14 in two sheets of a flexible plastic material in an appropriate manner. In particular, the first compartment 11 is formed by a lower longitudinal firm seal 131 extending along the infusion bag, a back firm seal 132, an upper longitudinal firm seal 133 and a right frangible seal 142. The second compartment 12 is formed by the lower longitudinal seal 131, the right frangible seal 142, the upper longitudinal seal 133 and a left frangible seal 141. The outlet compartment 16 is formed by a front firm seal 134 and the left frangible seal 141.

Centrally in the front firm seal 134 a port 4 is mounted which is in fluid connection with the outlet compartment 16. The port 4 is embodied to be connected to a structure or device for intravenous administration. In the back firm seal 132 a hole 15 is provided for hanging the infusion bag 1 on an appropriate support.

In use of the infusion bag 1, a user manually compresses the first compartment 11 such that the pressure inside the first compartment 11 is raised. Caused by this pressure raise, the right frangible seal 142 ruptures such that the first compartment 11 and the second compartments 12 form a common compartment. In the common compartment, the diluent 2 and the lyophilized drug formulation 3 are then mixed. Such mixing can be assisted by manually shaking the infusion bag 1. Thereby, the lyophilized drug is diluted and a solution is generated as drug substance. The infusion bag 1 is then hanged port 4 down on the support and an intravenous device is attached to the port 4. Now, the left frangible seal 141 is raptured by manually applying a pressure to the common compartment. Thereby, the infusion bag 1 is changed to a single compartment infusion bag and can be applied as known in the art.

Figure 3:
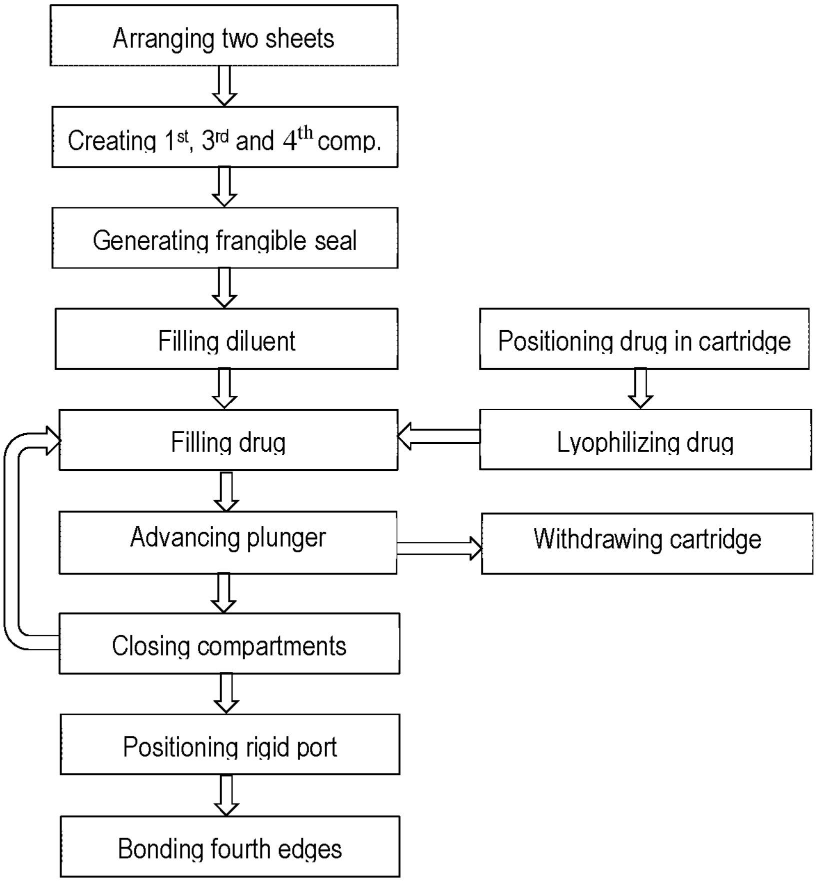
FIG. 3 shows a flow scheme of a second embodiment of a method of manufacturing a flexible container according to the invention.

FIG. 3 shows a second embodiment of a method of manufacturing an infusion bag as a flexible container housing a drug substance according to the invention. The method is embodied in a side fill and seal process or in a blow fill and seal (BFS) process in an at least partially aseptic environment. The method of FIG. 3 comprises generally the same steps as the method described above in connection with FIG. 1. Thus, for aspects not described in the following, it is referred to the description relating to FIG. 1 above.

In contrast to the method of FIG. 1, in step B, firm seals are provided in the two sheets by appropriately pressurizing and heating the two sheets such that a first compartment, a third compartment and a fourth compartment are created. The two sheets are also pressurized and heated at lower pressure and temperature such that the third and fourth compartments are closed towards the first compartment by frangible seals. At the end of step B, the first compartment is open towards a front end as well as the third and fourth compartments are open towards opposing lateral ends of the two sheets.

Further, in contrast to the method of FIG. 1, the method of FIG. 3 repeats steps E and F. More specifically, by repeatedly or parallelly performing steps $E_i$ and $E_{ii}$ plural tubular cartridges of two different sizes holding a lyophilized highly potent biopharmaceutical drug formulation are provided. Then the lyophilized dry drug formulation is filled into the second, third and forth compartments by, in a step $E_{iii}$, introducing the tubular cartridges holding the dry drug formulation through respective openings of the second, third and fourth compartments. Then, in a step $E_{iv}$ the content of the tubular cartridges is forwarded into the respective compartments, and in a step $E_v$ the tubular cartridges are withdrawn out of the openings of the second, third and fourth compartments and out of the container.

Following step E, the second, third and fourth compartments are closed or sealed in a step F. In particular, the second pressure and the second temperature are applied such that a second frangible seal is generated closing the second compartment. Further, the first pressure and the first temperature are applied such that firm seals are generated closing the third and fourth compartments.

Figure 4:
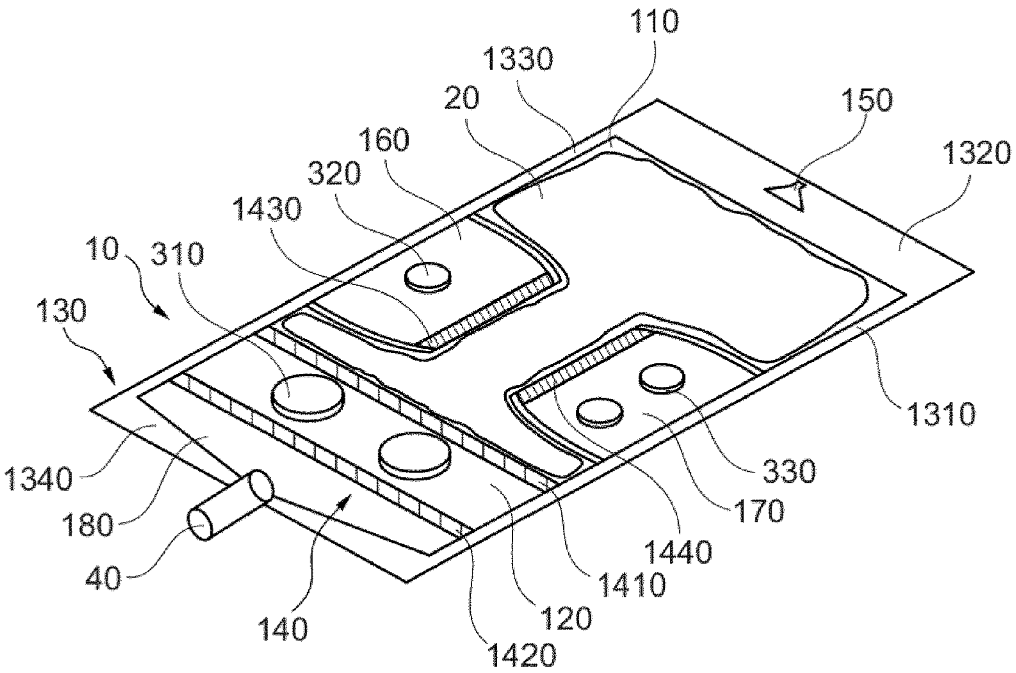
FIG. 4 shows a flexible container manufactured by the method of FIG. 3.

In FIG. 4 a second embodiment of a flexible container according to the invention in the form of an infusion bag 10 is shown as it results from the method described above in connection with FIG. 3. The infusion bag 10 has a first compartment 110 housing a liquid diluent 20, a second compartment 120 housing two large portions of a highly potent lyophilized drug formulation 310, a third compartment 160 housing one small portion of the highly potent lyophilized drug formulation 320, a fourth compartment 170 housing two small portions of the highly potent lyophilized drug formulation 330, and an outlet compartment 180.

The compartments 110, 120, 160, 170, 180 are formed by generating firm seals 130 and frangible seals 140 in an appropriate manner. In particular, a lower longitudinal firm seal 1310 extending along the infusion bag 10, a back firm seal 1320, an upper longitudinal firm seal 1330 and a front firm seal 1340 are generated. The first compartment 110 is separated from the second compartment 120 by right frangible seal 1410, from the third compartment 160 by an upper non-continuous frangible seal 1430, and from the fourth compartment 170 by a lower non-continuous frangible seal 1440. The second compartment 120 is separated from the outlet compartment by a left frangible seal 1420.

Centrally in the front firm seal 1340 a port 40 is mounted which is in fluid connection with the outlet compartment 180. The port 40 is embodied to be connected to a structure or device for intravenous administration. In the back firm seal 1320 a hole 150 is provided for hanging the infusion bag 10 on an appropriate support.

In use of the infusion bag 10, a practitioner manually presses the first compartment 110 such that the pressure inside the first compartment 110 raises. Caused by this pressure raise, the right frangible seal 1410 ruptures such that the first compartment 110 and the second compartment 120 together form a common compartment. As the need may be, the dosage is adjusted by additionally rupturing the upper non-continuous frangible seal 1430 and/or the lower non-continuous frangible seal 1440. Like this, any or none of the small portions of the highly potent lyophilized drug formulation 320, 330 can be added to the common compartment. In the common compartment, the diluent 20 and the lyophilized drug formulation 30 are mixed. Thereby, the lyophilized drug is diluted and a solution is generated as final drug substance. After being visually inspected for proper mixing and absence of any visual particles, an intravenous device is attached to the port 40 and the left frangible seal 1420 is raptured by manually applying a pressure to the common compartment. Then, the infusion bag 10 is hanged port 40 down on the support.

Figure 5:
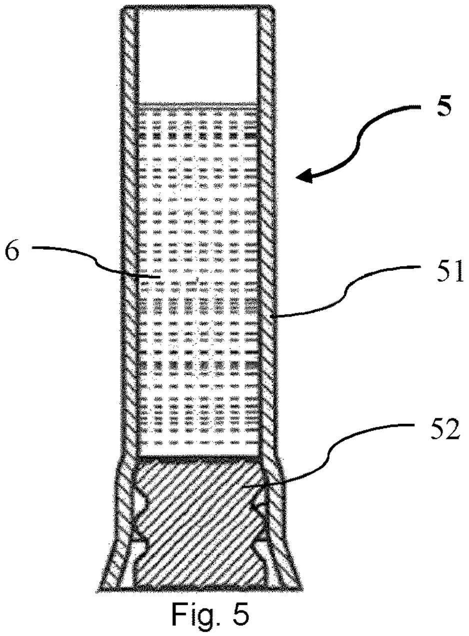
FIG. 5 shows a tubular cartridge as it can be used in the first method of FIG. 1 or in the second method of FIG. 3 before lyophilization.

In FIG. 5 a tubular cartridge 5 as it can be used in a method according to the invention is shown. The tubular cartridge 5 has a hollow and essentially cylindrical body 51 made of a material having a high thermal conductivity.

Towards its lower end, the body 51 widens such that it comprises a conical section. Into the conical section of the body 51 a stopper 52 is provided for tightening the interior of the body 51. Inside the interior above the stopper 52 a liquid drug formulation is positioned.

Figure 6:
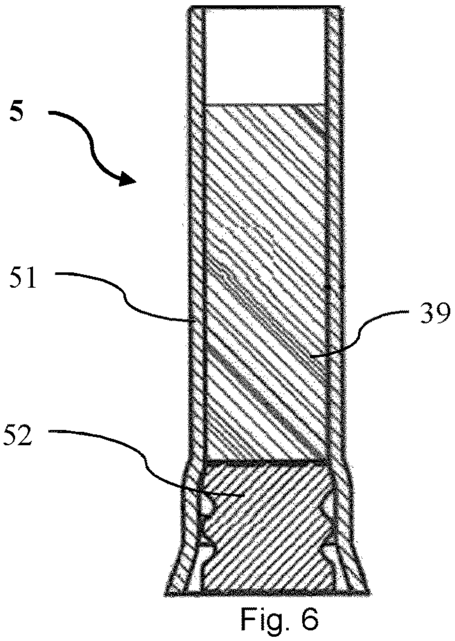
FIG. 6 shows the tubular cartridge of FIG. 5 after lyophilization.

The drug formulation is then lyophilized inside the tubular cartridge 5 such that a dry drug formulation 39 is generated as shown in FIG. 6. and held in the tubular cartridge. Before, filling the lyophilized or dry drug formulation 39 into a compartment of a flexible container the stopper 52 is removed. The dry drug formulation 39 is still held inside the body 51 by friction. The conical section of the body allows on one hand an efficient manipulation of the stopper 52 and on the other hand an efficient transfer of the dry drug formulation out of the tubular cartridge 5. By using the tubular cartridge 5, it can be assured that the dry drug formulation 39 is provided inside the interior of the compartment distant from an edge thereof. Like this, contamination of the edge to be sealed or even loss of dry drug formulation out of the compartment can be prevented.

This description and the accompanying drawings that illustrate aspects and embodiments of the present invention should not be taken as limiting the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the Figs. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope.

The invention claimed is:

1. A method of manufacturing a flexible container housing a drug substance, the method comprising:
- forming a first compartment of a container out of a flexible sheet-like material;
- filling a liquid into the first compartment of the container;
- sealing the first compartment;
- forming a second compartment of the container out of the flexible sheet-like material;
- filling a dry drug formulation into the second compartment;
- sealing the second compartment; and
- lyophilizing the dry drug formulation inside a tubular cartridge such that the dry drug formulation is generated and held in the tubular cartridge,
- wherein filling the dry drug formulation into the second compartment comprises:
  - introducing the tubular cartridge holding the dry drug formulation through an opening of the second compartment of the container such that an open end of the tubular cartridge is positioned distant from the opening of the second compartment,
  - providing the dry drug formulation out of the open end of the tubular cartridge into the second compartment, and
  - withdrawing the tubular cartridge out of the opening of the second compartment of the container,
- wherein the first compartment is separated from the second compartment by a frangible seal which opens when the first compartment is compressed; and
- wherein the second compartment has an opposite end at a maximum distance to the opening of the second compartment, and the dry drug formulation is provided out of the open end of the tubular cartridge into the second compartment near the opposite end of the second compartment.

2. The method of claim 1, wherein the dry drug formulation is a high potency drug formulation.

3. The method of claim 2, wherein the high potency drug formulation comprises a biological component.

4. The method of claim 1, wherein the liquid comprises a solvent for dissolving the dry drug formulation.

5. The method of claim 1, wherein the tubular cartridge has a conical shape widening towards the open end of the tubular cartridge.

6. The method of claim 1, wherein the tubular cartridge is essentially cylindrical.

7. The method of claim 1, wherein an inner wall of the tubular cartridge is coated with a friction reducing material.

8. The method of claim 1, wherein providing the dry drug formulation out of the open end of the tubular cartridge into the second compartment comprises forwarding a plunger through the tubular cartridge towards the open end such that the dry drug formulation is pushed out of the open end of the tubular cartridge.

9. The method of claim 1, wherein forming the first compartment of the container comprises sealing the flexible sheet-like material such that a firm seal is generated which does not open when the first compartment is compressed.

10. The method of claim 9, wherein the firm seal is generated by sealing the flexible sheet-like material at first conditions and the frangible seal is generated by sealing the flexible sheet-like material at second conditions different from the first conditions.

11. The method of claim 1, wherein forming the second compartment of the container comprises sealing a port to the flexible sheet-like material such that a content of the second compartment can be expelled through the port.

12. The method of claim 1, further comprising:
forming a third compartment of the container out of the flexible sheet-like material,
lyophilizing a dry further drug formulation inside a further tubular cartridge such that the dry further drug formulation is generated and held in the further tubular cartridge,
filling the dry further drug formulation into the third compartment by
introducing the further tubular cartridge holding the dry further drug formulation through an opening of the third compartment of the container such that an open end of the further tubular cartridge is positioned distant from the opening of the third compartment,
providing the dry further drug formulation out of the open end of the further tubular cartridge into the third compartment, and
withdrawing the further tubular cartridge out of the opening of the third compartment of the container, and
sealing the third compartment.

13. The method of claim 1, wherein the container is an infusion bag.

14. The method of claim 1, comprising visually inspecting the first compartment and the second compartment for particulate matter, after sealing the first compartment and the second compartment.

15. The method of claim 14, wherein the first compartment and the second compartment are at least partially transparent.

16. The method of claim 1, implemented in a blow fill and seal process.

* * * * *